United States Patent
Fukuhara et al.

(10) Patent No.: US 8,234,933 B2
(45) Date of Patent: Aug. 7, 2012

(54) ULTRASONIC METER FOR DETERMINING PHYSICAL QUANTITY OF A FLUID BASED ON A DETERMINED PLURALITY OF CORRELATION COEFFICIENTS

(75) Inventors: Satoshi Fukuhara, Tokyo (JP); Akira Kataoka, Tokyo (JP); Nobuhiro Ukezono, Tokyo (JP); Kohei Izu, Tokyo (JP); Kazutoshi Okamoto, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 316 days.

(21) Appl. No.: 12/644,942

(22) Filed: Dec. 22, 2009

(65) Prior Publication Data

US 2010/0154562 A1 Jun. 24, 2010

(30) Foreign Application Priority Data

Dec. 24, 2008 (JP) ............................... P2008-326905

(51) Int. Cl.
*G01F 1/66* (2006.01)
(52) U.S. Cl. ....................... 73/861.25; 702/48
(58) Field of Classification Search .................. None
See application file for complete search history.

(56) References Cited

U.S. PATENT DOCUMENTS

| | | | |
|---|---|---|---|
| 6,378,357 B1 * | 4/2002 | Han et al. ....................... | 73/54.41 |
| 6,931,945 B2 * | 8/2005 | Takeda et al. ................. | 73/861.25 |
| 2002/0166383 A1 | 11/2002 | Han et al. | |
| 2005/0241411 A1 | 11/2005 | Hishida et al. | |
| 2005/0245827 A1 * | 11/2005 | Takeda et al. .................. | 600/450 |

FOREIGN PATENT DOCUMENTS

| | | |
|---|---|---|
| JP | 05-212032 A | 8/1993 |
| JP | 2002-243856 A | 8/2002 |
| JP | 2003-344131 B2 | 12/2003 |
| JP | 2005-181268 A | 7/2005 |

OTHER PUBLICATIONS

Japanese Office Action corresponding to Japanese Patent Application No. 2008-326905, mailed Mar. 29, 2011.
European Search Report corresponding to European Patent Application No. 09180377.5, dated May 3, 2011.
M. Grout, Instrumentation Industrielle, Dec. 31, 2002, p. 150, XP002632433.

* cited by examiner

Primary Examiner — Harshad R Patel
(74) Attorney, Agent, or Firm — Sughrue Mion, PLLC

(57) ABSTRACT

An ultrasonic meter may include, but is not limited to, an emitter that emits a series of ultrasonic burst signals towards a fluid containing bubbles and/or particles, the series of ultrasonic burst signals being reflected by the air bubbles and/or particles in the fluid to be a series of reflected signals, a receiver that receives the series of reflected signals, and a calculator that calculates a plurality of correlation coefficients by performing a correlation processing on a series of received signals outputted from the receiver, the calculator calculating a physical quantity of the fluid based on the plurality of correlation coefficients.

17 Claims, 4 Drawing Sheets

US 8,234,933 B2

ULTRASONIC METER FOR DETERMINING PHYSICAL QUANTITY OF A FLUID BASED ON A DETERMINED PLURALITY OF CORRELATION COEFFICIENTS

BACKGROUND OF THE INVENTION

1. Field of the Invention

The present invention generally relates to an ultrasonic meter that measures flow velocity and volumetric flow of fluid.

Priority is claimed on Japanese Patent Application No. 2008-326905, filed Dec. 24, 2008, the content of which is incorporated herein by reference.

2. Description of the Related Art

As is generally known, there is a reflection correlation type ultrasonic flow meter that uses a reflection correlation method. The reflection correlation type ultrasonic flow meter measures flow velocity by performing a cross correlation processing on a reflected wave. The reflected wave is generated by an ultrasonic pulse emitted to a fluid and reflected by air bubbles and/or particles in the fluid. The reflection correlation type ultrasonic flow meter calculates volumetric flow based on the flow velocity and flow passage sectional area.

A Doppler type flow meter based on a pulse Doppler method is one of other things. The Doppler type flow meter measures flow velocity based on a frequency shift volume that is a Doppler shift volume of a reflected wave. The reflected wave is obtained by an ultrasonic pulse emitted towards a fluid and reflected by air bubbles and/or particles in the fluid. The Doppler type flow meter calculates volumetric flow based on the flow velocity and flow passage sectional area.

Japanese Patent No. 3669580 discloses an ultrasonic flow velocity profile and flow meter based on a combination of the reflection correlation method and the pulse Doppler method. A peak point of cross correlation value based on the reflection correlation method is a value that shows the flow velocity. A plurality of values with high correlativity appear at regular intervals as a result of cross correlation processing. A plurality of flow velocities based on the reflection correlation method are obtained for every fixed value, which is called "multi peak." It cannot be defined uniquely which peak point of cross correlation value should be adopted as a value that shows a true flow velocity. The multi peak is avoided by calculating an approximate value of the flow velocity based on the pulse Doppler method first, calculating a cross correlation value based on the reflection correlation method, and determining the true flow velocity from the cross correlation value that is in a range of the approximate value of the flow velocity by the pulse Doppler method.

Japanese Unexamined Patent Application, First Publications, No. 2005-181268 also discloses an ultrasonic flow meter that uses the reflection correlation method.

Upper limit of the flow velocity that can be measured in the pulse Doppler method is lower than that in the reflection correlation method, for the reflection correlation method has no upper limit theoretically. The lower limit in the pulse Doppler method is higher than that in the reflection correlation method when a flow velocity is low because the accuracy decreases. Because the range of the flow velocity that can be measured in the pulse Doppler method is narrower than that in the reflection correlation method, the application of the pulse Doppler method is limited. In the pulse Doppler method, the flow velocity is not acquired when a flow of air bubbles and/or particles contained in the fluid is intermittent.

Because the prior art combines the reflection correlation method and the pulse Doppler method and calculates the flow velocity using each of the methods, the configuration of the device is complex in the prior art.

SUMMARY

An ultrasonic meter may include, but is not limited to, an emitter that emits a series of ultrasonic burst signals towards a fluid containing bubbles and/or particles, the series of ultrasonic burst signals being reflected by the air bubbles and/or particles in the fluid to be a series of reflected signals, a receiver that receives the series of reflected signals, and a calculator that calculates a plurality of correlation coefficients by performing a correlation processing on a series of received signals outputted from the receiver, the calculator calculating a physical quantity of the fluid based on the plurality of correlation coefficients.

An ultrasonic meter may include, but is not limited to, a generating circuit that generates a series of burst signals, a transducer that receives the series of burst signals, the transducer converting the series of burst signals to a series of ultrasonic burst signals, the transducer emitting the series of ultrasonic burst signals to a fluid containing bubbles and/or particles, the transducer receiving the series of ultrasonic burst signals which has been reflected by the bubbles and/or particles in the fluid, the transducer converting the series of reflected ultrasonic burst signals to a series of electrical received signals, and the transducer outputting the series of electrical received signals, an A/D converter that receives the series of electrical received signals, the A/D converter converting the series of electrical received signals to a series of digital received signals, and the A/D converter outputting the series of digital received signals, a first operation unit that receives the series of digital received signals, the first operation unit performing a correlation processing on the series of digital received signals to calculate a flow velocity profile, and the first operation unit outputting the flow velocity profile, and a second operation unit that receives the flow velocity profile, the second operation unit calculating a volumetric flow based on the flow velocity profile.

A method of calculating a flow velocity of a fluid may include, but is not limited to, generating a series of burst signals, converting the series of burst signals to a series of ultrasonic burst signals, irradiating the series of ultrasonic burst signals to the fluid containing bubbles and/or particles, converting a series of reflected ultrasonic burst signals that has been reflected by the bubbles and/or particles in the fluid to a series of electrical received signals, converting the series of electrical received signals to a series of digital received signals, performing correlation processing on the series of digital received signals to calculate a flow velocity profile, and calculating a volumetric flow based on the flow velocity profile.

This invention can measure physical quantities by an easy configuration of the device and avoid the occurrence of a multi peak without using the pulse Doppler method.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teaching of the present invention and that the invention is not limited to the embodiments illustrated herein for explanatory purposes.

Figure 1:
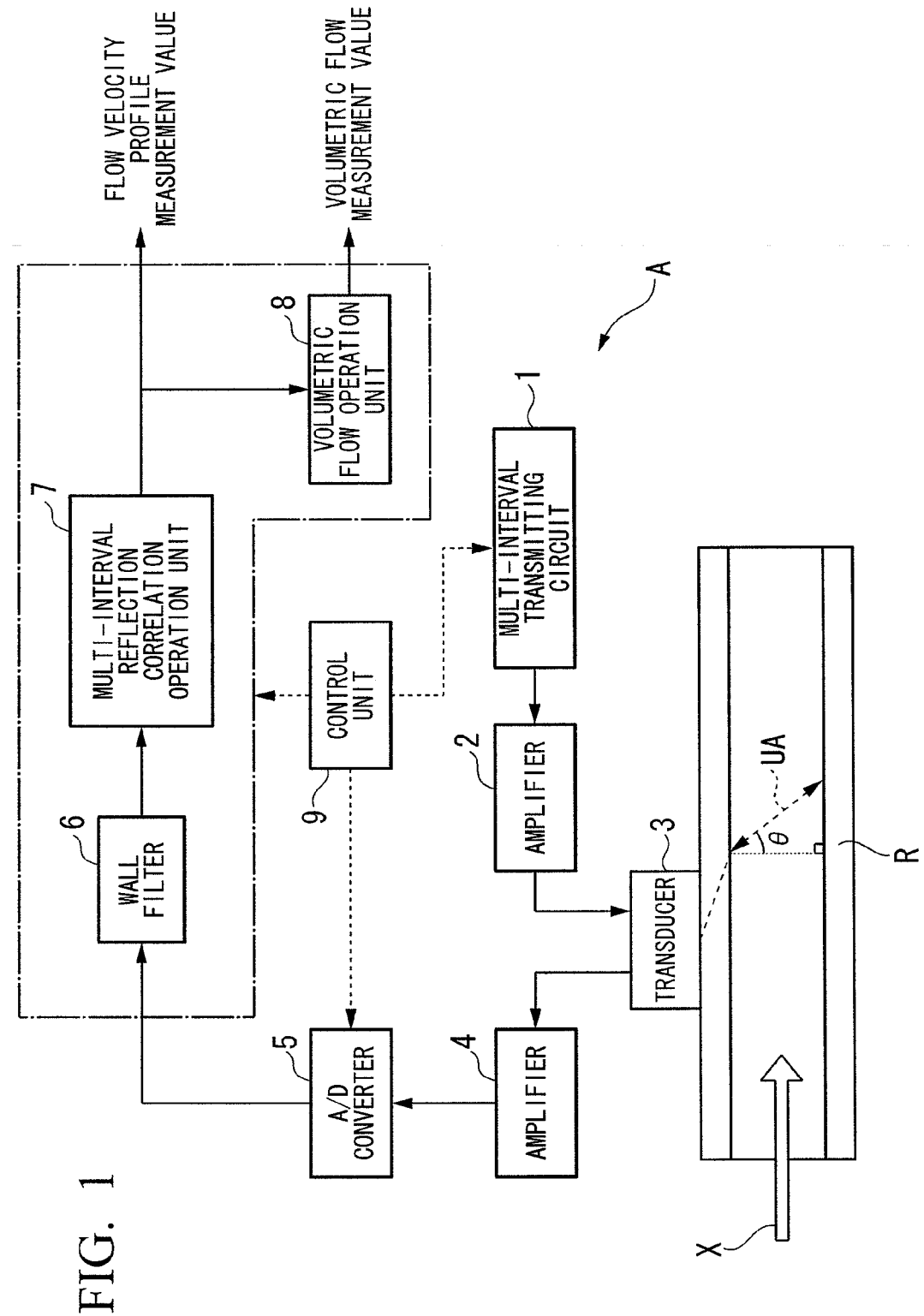
FIG. 1 is a block diagram illustrating a functional composition of an ultrasonic meter A in accordance with a first preferred embodiment of the present invention.

FIG. 1 is a block diagram illustrating a functional composition of an ultrasonic meter A in accordance with a first preferred embodiment of the present invention. With reference to FIG. 1, the ultrasonic meter A may include, but is not limited to, a multi-interval transmitting circuit 1, a first amplifier 2, a transducer 3, a second amplifier 4, an A/D converter 5, a wall filter 6, a multi-interval reflection correlation operation unit 7, a volumetric flow operation unit 8, and a control unit 9.

The multi-interval transmitting circuit 1, the first amplifier 2, the transducer 3, and the control unit 9 correspond to an ultrasonic wave emitter. The transducer 3, the second amplifier 4, the A/D converter 5, and the control unit 9 correspond to a reflected wave receiver. The wall filter 6, the multi-interval reflection correlation operation unit 7, the volumetric flow operation unit 8, and the control unit 9 correspond to a physical quantities operator. The first amplifier 2, the second amplifier 4, and the wall filter 6 are not necessary components and can be omitted.

The ultrasonic meter A is a measuring instrument that calculates a flow velocity profile of fluid X (measurement object) that flows in a conduit R that has a cross section of a prescribed shape, and calculates a volumetric flow Q of the fluid X based on an average of flow velocity and a cross-sectional area S of the conduit R obtained from the flow velocity profile. In the ultrasonic meter A, the wall filter 6, the multi-interval reflection correlation operation unit 7, and the volumetric flow operation unit 8 are functional components of an operation processing unit that performs signal processing in software. The operation processing unit includes an internal memory storing beforehand a calculating program that defines a parameter such as the cross-sectional area S or a calculating algorithm required for calculating the flow velocity profile and the volumetric flow Q.

The multi-interval transmitting circuit 1 is an electronic circuit that outputs a plurality of transmitting burst signals of different specification to the first amplifier 2. The transmitting burst signal has a frequency f in a frequency band of an ultrasonic wave, for example, between 500 kHz and 2 MHz. The transmitting burst signal includes a first, second and third transmitting burst signal each of which has pulse shape or a burst shape. The time interval between the pulse shape of the first transmitting burst signal and the pulse shape of the second transmitting burst signal is T1, the time interval between the pulse shape of the second transmitting burst signal and the pulse shape of the third transmitting burst signal is T2, and the time intervals T1 and T2 are different each other. The multi-interval transmitting circuit 1 includes a sinusoidal oscillator circuit and a strength modulation circuit that modulates the strength of a burst signal that repeats a continuous sine-wave signal of the frequency f. The continuous sine-wave signal is output from the sinusoidal oscillator circuit by the above time intervals.

The first amplifier 2 receives the transmitting burst signal from the multi-interval transmitting circuit 1. The first amplifier 2 amplifies the transmitting burst signal with the prescribed degree of amplification, and outputs it to the transducer 3.

The transducer 3 is disposed on the surface of the outside of conduit R. The transducer 3 is an electricity-sound converter. The transducer 3 receives the transmitting burst signal from the first amplifier 2. The transducer 3 converts the transmitting burst signal to an ultrasonic burst signal for measurement US. The ultrasonic burst signal for measurement US is emitted into the conduit R at an angle θ to the direction that crosses at a right angle in the direction of a flow of the fluid X. The ultrasonic burst signal for measurement US is reflected by particles such as air bubbles and/or particles in the conduit R and becomes an ultrasonic burst signal for estimation UA. The transducer 3 receives the ultrasonic burst signal for estimation UA and converts the ultrasonic burst signal for estimation UA to an electrical received signal.

The transmitting burst signal from the first amplifier 2 that is an electrical signal is converted to the ultrasonic burst signal for measurement US that is an ultrasonic wave. The ultrasonic burst signal for measurement US includes a plurality of ultrasonic burst signals of different specification. The ultrasonic burst signal for measurement US has the same frequency as the frequency f of the sine wave in the transmitting burst signal. The ultrasonic burst signal for measurement US is an acoustic signal of a burst shape that repeats with two different time intervals T1 and T2.

The ultrasonic burst signal for measurement US is reflected by air bubbles and/or particles in the fluid X that flows through inside of the conduit R in a direction toward the lower stream from the upper stream, the direction shown by an arrow marks X of FIG. 1, and become the ultrasonic burst signal for estimation UA. The transducer 3 receives in series the plurality of ultrasonic burst signals for estimation UA.

The ultrasonic burst signal for measurement US includes two different time intervals T1 and T2. In conventional flow velocity measurement that is based on reflection correlation method, an ultrasonic burst signal that consists of a single time interval is emitted to fluid to be measured. In the ultrasonic meter A in accordance with the first preferred embodiment of the present invention, the ultrasonic burst signal for measurement US that is repeated with two different time intervals T1 and T2 is emitted to the fluid X in the conduit R. The time interval T1 is not a multiple of the time interval T2, and the time interval T2 is not a multiple of the time interval T1. For example, T1:T2 equals to 2:3, 3:2, 5:8, or 8:5. In the following description, two different time intervals T1 and T2 may be described generically as a time interval T.

Figure 2:
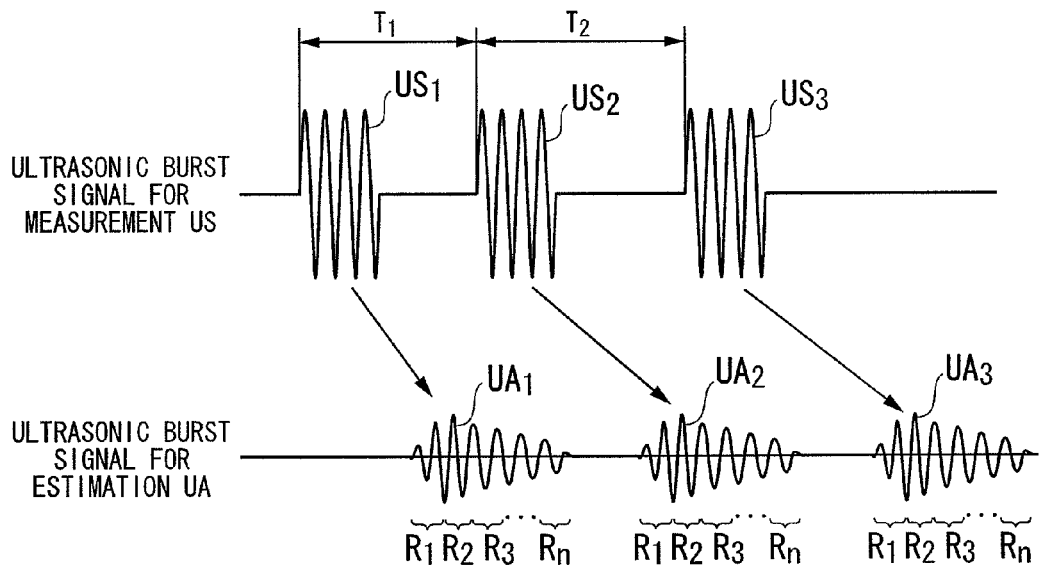
FIG. 2 is a waveform diagram illustrating a series of ultrasonic burst signals US and a series of ultrasonic burst signals UA in accordance with the first preferred embodiment of the present invention.

FIG. 2 is a waveform diagram illustrating the ultrasonic burst signal for measurement US and the ultrasonic burst signal for estimation UA in accordance with the first preferred embodiment of the present invention. The ultrasonic burst signal for measurement US includes a first ultrasonic burst signal US1, a second ultrasonic burst signal US2, and a third ultrasonic burst signal US3. Each of the first, second, and third ultrasonic burst signals US1, - - -, US3 is a sine wave of frequency f. The time interval between the first ultrasonic burst signal US1 and the second ultrasonic burst signal US2 is T1. The time interval between the second ultrasonic burst signal US2 and the third ultrasonic burst signal US3 is T2.

The ultrasonic burst signal for estimation UA includes a first reflected signal UA1, a second reflected signal UA2, and a third reflected signal UA3. The first ultrasonic burst signal US1 is reflected by air bubbles and/or particles in the fluid X and becomes the first reflected signal UA1. The second ultrasonic burst signal US2 is reflected by air bubbles and/or particles in the fluid X and becomes the second reflected signal UA2. The third ultrasonic burst signal US3 is reflected by air bubbles and/or particles in the fluid X and becomes the third reflected signal UA3.

The transducer 3 receives the ultrasonic burst signal for estimation UA including the first, second, and third reflected signals UA1, - - -, UA3. The transducer 3 converts the ultrasonic burst signal for estimation UA to the electrical received signal including three electrical burst signals corresponding to the first, second, and third reflected signals UA1, - - -, UA3.

The second amplifier 4 receives the electrical received signal from the transducer 3. The second amplifier 4 amplifies the electrical received signal with a prescribed amplification degree, and outputs it to the A/D converter 5.

The A/D converter 5 receives the electrical received signal from the second amplifier 4. The A/D converter 5 converts the electrical received signal to a digital received data signal. The converting is performed by sampling the electrical received signal in a prescribed sampling rate. The prescribed sampling rate fulfills sampling theorem, and equals to a repeating cycle that is more than double of the frequency f. The A/D converter 5 outputs the digital received data signal to the wall filter 6.

The wall filter 6, the multi-interval reflection correlation operation unit 7, and the volumetric flow operation unit 8 are functional components of the operation processing unit that performs a signal processing in software on the digital received data signal from the A/D converter 5.

The wall filter 6 receives the digital received data signal from the A/D converter 5. The wall filter 6 removes an echo element that is a noise signal generated by reflection in the conduit R included in the digital received data signal by performing a filter processing of a prescribed algorithm on the digital received data signal. The wall filter 6 outputs the digital received data signal that includes only elements reflected by air bubbles and/or particles in the fluid X to the multi-interval reflection correlation operation unit 7.

The multi-interval reflection correlation operation unit 7 receives the digital received data signal from the wall filter 6, which is a burst signal removed of the echo element of the ultrasonic burst signal for estimation UA. The multi-interval reflection correlation operation unit 7 calculates a speed distribution of passing air bubbles and/or particles in each position, in a word, a flow velocity profile of the fluid X that is the flow velocity profile in the conduit R. The calculating is performed by performing a correlation operation processing on the digital received data signal in each of a plurality of time domains R1, R2, - - -, Rn as illustrated in FIG. 2. The flow velocity profile that is a calculation result of the multi-interval reflection correlation operation unit 7 is outputted to the volumetric flow operation unit 8 and is outputted outside as one of the measurement values of the ultrasonic meter A. Operations of the multi-interval reflection correlation operation unit 7 will be described below.

The volumetric flow operation unit 8 receives the flow velocity profile from the multi-interval reflection correlation operation unit 7. The volumetric flow operation unit 8 calculates the volumetric flow Q of the fluid X based on the flow velocity profile and the cross-sectional area S of the conduit R near the position where the flow velocity is calculated.

The control unit 9 synchronously controls the multi-interval transmitting circuit 1, the A/D converter 5, and the operation processing unit. The control unit 9 controls the A/D converter 5 converting the electrical received signal to a digital received data signal synchronizing with a generating timing of the transmitting burst signal in the multi-interval transmitting circuit 1. The control unit 9 controls the operation processing unit performing operation processing of the digital received data signal.

Next, a detailed operation of the ultrasonic meter A configured in the above-mentioned way will be described with reference to FIG. 3 and FIG. 4.

The multi-interval-transmitting circuit 1 outputs the transmitting burst signal to the first amplifier 2 when the control unit 9 outputs a transmitting instruction signal that instructs the start of measurement. The first amplifier 2 receives the transmitting burst signal, amplifies the transmitting burst signal, and outputs the transmitting burst signal to the transducer 3. The transducer 3 receives the transmitting burst signal, converts the transmitting burst signal to the ultrasonic wave that is the ultrasonic burst signal for measurement US, and emits the ultrasonic burst signal for a measurement US as is illustrated in FIG. 2 to the conduit R. The ultrasonic burst signal for the measurement US is reflected by air bubbles and/or particles in the fluid X that flows through the inside of the conduit R toward the lower stream from the upper stream, and becomes the ultrasonic burst signal for estimation UA. The ultrasonic burst signal for estimation UA is detected by the transducer 3.

The transducer 3 converts the ultrasonic burst signal for estimation UA to the electrical received signal and outputs the electrical received signal to the second amplifier 4. The ultrasonic burst signal for measurement US includes the first, second, and third ultrasonic burst signals US1, - - -, US3. The ultrasonic burst signal for estimation UA includes the first, second, and third reflected signals UA1, - - -, UA3. The first ultrasonic burst signal US1 is reflected by air bubbles and/or particles in the fluid X and becomes the first reflected signal UA1. The second ultrasonic burst signal US2 is reflected by air bubbles and/or particles in the fluid X and becomes the second reflected signal UA2. The third ultrasonic burst signal US3 is reflected by air bubbles and/or particles in the fluid X and becomes the third reflected signal UA3.

The electrical received signal is converted from the ultrasonic burst signal for estimation UA that includes the first, second, and third reflected signals UA1, - - -, UA3. The electrical received signal includes information similar to the first, second, and third reflected signals UA1, - - -, UA3. The electrical received signal that is an analogue signal is converted to the digital received data signal that is a digital signal in the A/D converter 5, and the digital received data signal is outputted to the wall filter 6. Since quantization processing in the A/D converter 5 satisfies the sampling theorem, the digital received data signal includes the same information that the electrical received signal has.

The wall filter 6 receives the digital received data signal, and performs the filtering processing on the digital received data signal. The digital received data signal comes to include only signal elements reflected by air bubbles and/or particles in the fluid X. The digital received data signal is outputted to the multi-interval reflection correlation operation unit 7.

The multi-interval reflection correlation operation unit 7 calculates a first cross correlation coefficient of the first reflected signal UA1 and the second reflected signal UA2, hereinafter referred to as first correlation coefficients K1, and a second cross correlation coefficient of the second reflected signal UA2 and the third reflected signal UA3, hereinafter referred to as second correlation coefficients K2.

Figure 3:
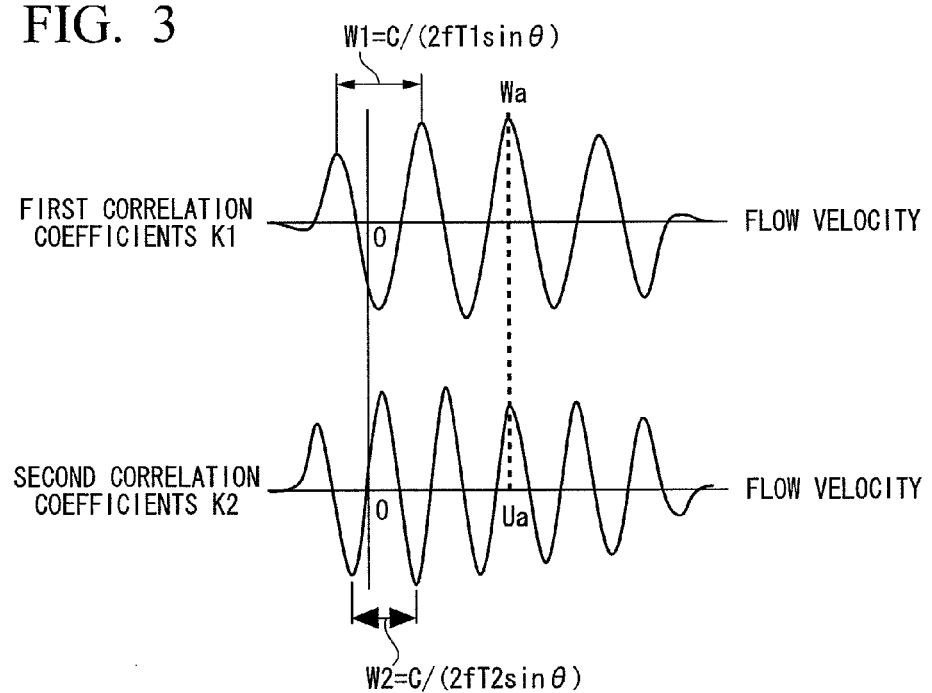
FIG. 3 is a waveform diagram illustrating change of first correlation coefficients K1 and second correlation coefficients K2 in accordance with the first preferred embodiment of the present invention.

FIG. 3 is a waveform diagram illustrating change of the first correlation coefficients K1 and the second correlation coefficients K2 in accordance with the first preferred embodiment of the present invention. As is generally known, in calculating a cross correlation coefficient of signals, each correlation coefficient of the first and second correlation coefficients K1 and K2 is calculated by offsetting relative positions on axis of time of two signals that are the target of the calculation respectively. The horizontal axis of FIG. 3 indicates the flow velocity of the fluid X. Each of the first and second correlation coefficients K1 and K2 is a waveform of burst shape that oscillates by the cycle of the ultrasonic burst signal for measurement US, which is caused by "multi peak" that results from periodicity of the ultrasonic burst signal for measurement US. An oscillation cycle W of the first and second correlation coefficients K1 and K2 is given by the following arithmetic expression (1) with parameters of the ultrasonic frequency f, the time interval T, an angle θ, and acoustic velocity C.

$$W = C/(2fT \sin θ) \quad (1)$$

The first correlation coefficients K1 is a quantity that shows a correlation of the first reflected signal UA1 and the second reflected signal UA2. The time interval between the first reflected signal UA1 and the second reflected signal UA2 is the first time interval T1. The first oscillation cycle W1 is expressed as the following arithmetic expression (2) based on the arithmetic expression (1). The second correlation coefficients K2 is a quantity that shows a correlation between the second reflected signal UA2 and the third reflected signal UA3. The time interval between the second reflected signal UA2 and the third reflected signal UA3 is the second time interval T2 that is different from the first time interval T1. The second oscillation cycle W2 is expressed as the following arithmetic expression (3) based on the arithmetic expression (1).

$$W1 = C/(2fT1 \sin θ) \quad (2)$$

$$W2 = C/(2fT2 \sin θ) \quad (3)$$

A flow velocity Ua that gives a peak point Wa, which is common to the first and second correlation coefficients K1 and K2, is the true flow velocity of the fluid X, and other peak points do not correspond to the true flow velocity of the fluid X.

The multi-interval reflection correlation operation unit 7 calculates a correlation coefficient for estimation Kh by multiplying the first correlation coefficients K1 by the second correlation coefficients K2. The flow velocity Ua that provides the peak point of the correlation coefficient for estimation Kh, in a word, the peak point Wa, which is common to the first and second correlation coefficients K1 and K2, is assumed to be a flow velocity measurement value. The correlation coefficient for estimation Kh is calculated by multiplying the first correlation coefficients K1 by the second correlation coefficients K2. Peak points other than the peak point Wa, which are common to the first and second correlation coefficients K1 and K2, are relatively suppressed compared to the peak point Wa and become small. The correlation coefficient for estimation Kh has a waveform in which the peak point Wa, which is common to the first and second correlation coefficients K1 and K2, is emphasized.

Figure 4A:
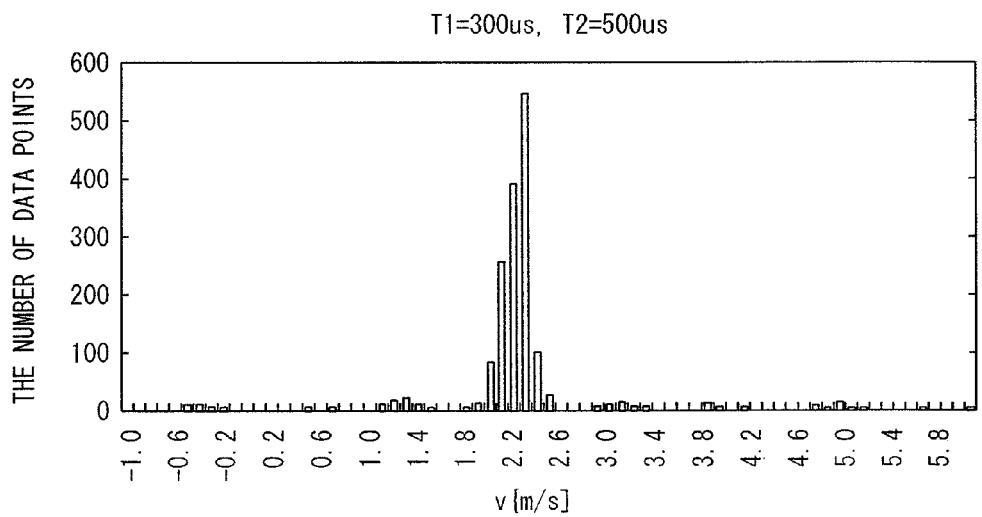
FIG. 4A is a bar chart illustrating an experimental result of measuring flow velocities when the first time interval is set to 300 μs and the second time interval is set to 500 μs in accordance with the first preferred embodiment of the present invention.
Figure 4B:
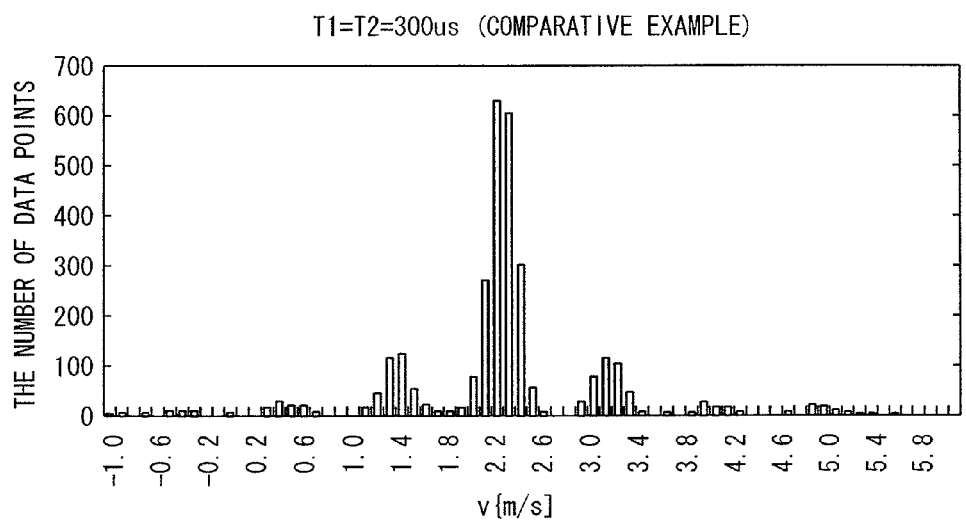
FIG. 4B is a bar chart illustrating an experimental result of measuring flow velocities when the first time interval and the second time interval are set to 300 μs for a comparative example of FIG. 4A.

FIG. 4A is a bar chart illustrating an experimental result of measuring flow velocities when the first time interval T1 is set to 300 μs and the second time interval T2 is set to 500 μs in accordance with the first preferred embodiment of the present invention. FIG. 4B is a bar chart illustrating an experimental result of measuring flow velocities when the first time interval T1 and the second time interval T2 are set to 300 μs for a comparative example of FIG. 4A. As is understood by comparing FIG. 4A and FIG. 4B, when the first time interval T1 and the second time interval T2 are different, data concentrates on one point that shows the true flow velocity, compared with the situation when the time interval T1 and the time interval T2 are the same, and the influence of "multi peak" is reduced greatly.

To effectively emphasize the peak point Wa, which is common to the first correlation coefficients K1 and the second correlation coefficients K2, the time interval T1 is not a multiple of the time interval T2, and the time interval T2 is not a multiple of the time interval T1. For example, T1:T2 equals to 2:3, 3:2, 5:8, or 8:5.

In the ultrasonic meter A in accordance with the first preferred embodiment of the present invention, the ultrasonic burst signal for measurement US is emitted towards the fluid X. The ultrasonic burst signal for measurement US includes the first, second, and third ultrasonic burst signals US1, - - -, US3. The time interval between the first ultrasonic burst signal US1 and the second ultrasonic burst signal US2 is T1. The time interval between the second ultrasonic burst signal US2 and the third ultrasonic burst signal US3 is T2. The ultrasonic burst signal for measurement US is reflected by air bubbles and/or particles in the fluid X and becomes the ultrasonic burst signal for estimation UA. The flow velocity of the fluid X is calculated based on the first and second correlation coefficients K1 and K2 that depend on the ultrasonic burst signal for estimation UA. The true flow velocity can be measured without suffering from a "multi peak" and with easy device configuration.

The multi-interval reflection correlation operation unit 7 calculates the first and second correlation coefficients K1 and K2 in each time domain R1, R2, - - -, Rn illustrated in FIG. 2. The multi-interval reflection correlation operation unit 7 calculates the flow velocity profile in each area in the conduit R corresponding to each time domain R1, R2, - - -, Rn. The multi-interval reflection correlation operation unit 7 outputs the flow velocity profile to the volumetric flow operation unit 8.

The volumetric flow operation unit 8 receives the flow velocity profile. The volumetric flow operation unit 8 calculates an average flow velocity u that is the weighted average value of the flow velocity profile. The volumetric flow operation unit 8 calculates the volumetric flow Q of the fluid X based on the average flow velocity u and the cross-sectional area S of the conduit R. The volumetric flow operation unit 8 outputs the volumetric flow Q as a measuring result.

In the above-mentioned embodiment, the ultrasonic burst signal for measurement US that includes the first, second, and third ultrasonic burst signals US1, - - -, US3 are emitted to the fluid X. In order to emphasize still more effectively the peak point Wa that shows the true flow velocity, the ultrasonic burst signal for measurement US may further include a fourth ultrasonic burst signal US4. The time interval between the third ultrasonic burst signal US3 and the fourth ultrasonic burst signal US4 is a third time interval T3 different from the time intervals T1 and T2, and the flow velocity profile may be calculated by using the ultrasonic burst signal for measurement US. The ultrasonic burst signal for measurement US may further include a fifth ultrasonic burst signal US5. Time interval between the fourth ultrasonic burst signal US4 and the fifth ultrasonic burst signal US5 is a fourth time interval T4 different from the time intervals T1, T2 and T3, and the flow velocity profile may be calculated using the ultrasonic burst signal for measurement US.

When the ultrasonic burst signal for measurement US that includes the first, second, third and fourth ultrasonic burst signals US1, - - -, US4 is emitted towards the fluid X, the first, second and third correlation coefficients K1, K2 and K3 are obtained. The correlation coefficient for estimation Kh is obtained by multiplying the first, second and third correlation coefficients K1, K2 and K3, and the flow velocity is specified based on the correlation coefficient for estimation Kh.

When the ultrasonic burst signal for measurement US that includes the first, second, third, fourth and fifth ultrasonic burst signals US1, - - -, US5 is emitted to the fluid X, the first, second, third and fourth correlation coefficients K1, K2, K3 and K4 are obtained. The correlation coefficient for estimation Kh is obtained by multiplying the first, second, third and fourth correlation coefficients K1, K2, K3 and K4, and the flow velocity is specified based on the correlation coefficient for estimation Kh.

Figure 5:
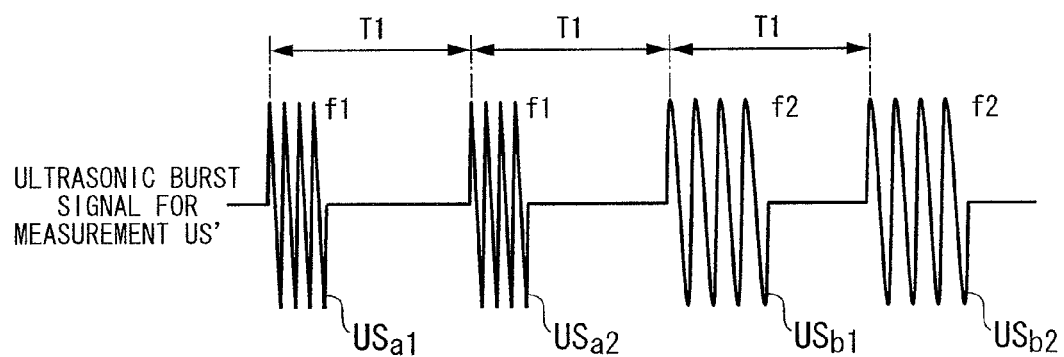
FIG. 5 is a waveform diagram illustrating another series of ultrasonic burst signals US' in accordance with the first preferred embodiment of the present invention.

The ultrasonic burst signal for measurement US may include six or more ultrasonic burst signals if necessary, and the flow velocity profile may be calculated by using the ultrasonic burst signal for measurement US. Instead of making the time intervals T1, T2, - - - be different values, the time interval T may be fixed to a definite value, and the frequency f of the ultrasonic burst signal emitted to the fluid X may be different frequencies f1 and f2 as illustrated in FIG. 5. In this case, the ultrasonic burst signal for measurement US' includes at least two pairs of ultrasonic burst signals USa1 and USa2, and USb1 and USb2. The ultrasonic burst signals USa1 and USa2 have the frequency f1, and the ultrasonic burst signals USb1 and USb2 have the frequency f2. The frequency f1 is not a multiple of the frequency f2, and the frequency f2 is not a multiple of the frequency f1. The ultrasonic burst signal for measurement US' is emitted towards the fluid X.

Each of reflected signals UAa1, UAa2, UAb1 and UAb2 respectively results from the corresponding ultrasonic burst signals USa1, USa2, USb1 and USb2. The first correlation coefficients K1 is obtained based on the reflected signals UAa1 and UAa2. The second correlation coefficients K2 is obtained based on the reflected signals UAb1 and UAb2. The correlation coefficient for estimation Kh is obtained based on the first and second correlation coefficients K1 and K2.

It is apparent that the present invention is not limited to the above embodiments, but may be modified and changed without departing from the scope and spirit of the invention.

What is claimed is:

1. An ultrasonic meter comprising:
an emitter that emits a series of ultrasonic burst signals towards a fluid containing at least one of bubbles and particles, the series of ultrasonic burst signals being reflected by at least one of the bubbles and particles in the fluid to be a series of reflected signals;
a receiver that receives the series of reflected signals; and
a calculator that calculates a plurality of correlation coefficients by performing a correlation processing on a series of received signals outputted from the receiver, the calculator calculating a physical quantity of the fluid based on the plurality of correlation coefficients, wherein
the series of ultrasonic burst signals includes a first, second and third ultrasonic burst part signals, the first ultrasonic burst part signal has a first frequency, the second ultrasonic burst part signal has a second frequency, the third ultrasonic burst part signal has a third frequency, a first time interval is defined between the first and second ultrasonic burst part signals, a second time interval is defined between the second and third ultrasonic burst part signals, the first time interval and the second time interval are different from each other,
the series of reflected signals includes a first, second and third reflected part signals, the first ultrasonic burst part signal is reflected by at least one of the bubbles and particles in the fluid to be the first reflected part signal, the second ultrasonic burst part signal reflected by at least one of the bubbles and particles in the fluid to be the second reflected part signal, the third ultrasonic burst part signal is reflected by at least one of the bubbles and particles in the fluid to be the third reflected part signal,
the series of received signals includes a first, second and third received part signals, and
the plurality of correlation coefficients includes a first correlation coefficient and a second correlation coefficient.

2. The ultrasonic meter according to claim 1, wherein the first time interval is not a multiple of the second time interval, and the second time interval is not a multiple of the first time interval.

3. The ultrasonic meter according to claim 1, wherein the physical quantity of the fluid includes a flow velocity profile and a volumetric flow.

4. An ultrasonic meter comprising:
an emitter that emits a series of ultrasonic burst signals towards a fluid containing at least one of bubbles and particles, the series of ultrasonic burst signals being reflected by at least one of the bubbles and particles in the fluid to be a series of reflected signals;
a receiver that receives the series of reflected signals; and
a calculator that calculates a plurality of correlation coefficients by performing a correlation processing on a series of received signals outputted from the receiver, the calculator calculating a physical quantity of the fluid based on the plurality of correlation coefficients, wherein
the series of ultrasonic burst signals includes a first pair of ultrasonic burst part signals and a second pair of ultrasonic burst part signals, each of the first pair of ultrasonic burst part signals has a first frequency, each of the second pair of ultrasonic burst part signals has a second frequency, the first frequency and the second frequency are different from each other, a first time interval is defined between the pair of first ultrasonic burst signals, a second time interval is defined between the pair of second ultrasonic burst signals, a third time interval is defined between one of the pair of first ultrasonic burst signals and one of the pair of second ultrasonic burst signals, and the first, second and third time intervals are all the same each other,
the series of reflected signals includes a first pair of reflected part signals and a second pair of reflected part signals,
the series of received signals includes a first pair of received part signals and a second pair of received part signals, and the plurality of correlation coefficients includes a first correlation coefficient and a second correlation coefficient.

5. The ultrasonic meter according to claim 4, wherein the first frequency is not a multiple of the second frequency, and the second frequency is not a multiple of the first frequency.

6. An ultrasonic meter comprising:
an emitter that emits a series of ultrasonic burst signals towards a fluid containing at least one of bubbles and particles, the series of ultrasonic burst signals being reflected by at least one of the bubbles and particles in the fluid to be a series of reflected signals;
a receiver that receives the series of reflected signals; and
a calculator that calculates a plurality of correlation coefficients by performing a correlation processing on a series of received signals outputted from the receiver, the calculator calculating a physical quantity of the fluid based on the plurality of correlation coefficients, wherein
the calculator calculates an additional correlation coefficient by multiplying the correlation coefficients, and a peak value of the additional correlation coefficient equals to a flow velocity of the fluid.

7. An ultrasonic meter comprising:
a generating circuit that generates a series of burst signals;
a transducer that receives the series of burst signals, the transducer converting the series of burst signals to a series of ultrasonic burst signals, the transducer emitting the series of ultrasonic burst signals to a fluid containing at least one of bubbles and particles, the transducer receiving the series of ultrasonic burst signals which has been reflected by at least one of the bubbles and particles in the fluid, the transducer converting the series of ultrasonic burst signals as reflected to a series of electrical received signals, and the transducer outputting the series of electrical received signals;
an A/D converter that receives the series of electrical received signals, the A/D converter converting the series of electrical received signals to a series of digital received signals, and the A/D converter outputting the series of digital received signals;
a first operation unit that receives the series of digital received signals, the first operation unit performing a correlation processing on the series of digital received signals to calculate a flow velocity profile, and the first operation unit outputting the flow velocity profile; and
a second operation unit that receives the flow velocity profile, the second operation unit calculating a volumetric flow based on the flow velocity profile,
wherein the series of ultrasonic burst signals includes a first, second and third ultrasonic burst part signals, the first ultrasonic burst part signal has a first frequency, the second ultrasonic burst part signal has a second frequency, the third ultrasonic burst part signal has a third frequency, a first time interval is defined between the first and second ultrasonic burst part signals, a second time interval is defined between the second and third ultrasonic burst part signals, and the first time interval and the second time interval are different from each other.

8. The ultrasonic meter according to claim 7, wherein the series of reflected ultrasonic burst signal includes a first, second and third reflected part signals, the first reflected part signal is generated by the first ultrasonic burst part signal reflected in the fluid, the second reflected part signal is generated by the second ultrasonic burst part signal reflected in the fluid, the third reflected part signal is generated by the third ultrasonic burst part signal reflected in the fluid,
the series of digital received signals includes a first, second and third digital received part signals, the first digital received part signal converted from the first reflected part signal, the second digital received part signal converted from the second reflected part signal, the third digital received part signal converted from the third reflected part signal,
the first operation unit calculates a first correlation coefficient and a second correlation coefficient by the correlation processing, the correlation processing is performed based on a first, second and third digital received part signals, and the first operation unit calculates the flow velocity profile based on the first and second correlation coefficients.

9. The ultrasonic meter according to claim 8, wherein the first operation unit calculates an additional correlation coefficient by multiplying the first and second correlation coefficients, and a peak value of the additional correlation coefficient equals to a flow velocity of the fluid.

10. The ultrasonic meter according to claim 7, wherein the first time interval is not a multiple of the second time interval, and the second time interval is not a multiple of the first time interval.

11. An ultrasonic meter comprising:
a generating circuit that generates a series of burst signals;
a transducer that receives the series of burst signals, the transducer converting the series of burst signals to a series of ultrasonic burst signals, the transducer emitting the series of ultrasonic burst signals to a fluid containing at least one of bubbles and particles, the transducer receiving the series of ultrasonic burst signals which has been reflected by at least one of the bubbles and particles in the fluid, the transducer converting the series of ultrasonic burst signals as reflected to a series of electrical received signals, and the transducer outputting the series of electrical received signals;
an A/D converter that receives the series of electrical received signals, the A/D converter converting the series of electrical received signals to a series of digital received signals, and the A/D converter outputting the series of digital received signals;
a first operation unit that receives the series of digital received signals, the first operation unit performing a correlation processing on the series of digital received signals to calculate a flow velocity profile, and the first operation unit outputting the flow velocity profile; and
a second operation unit that receives the flow velocity profile, the second operation unit calculating a volumetric flow based on the flow velocity profile,
wherein the series of ultrasonic burst signals includes a pair of first ultrasonic burst part signals and a pair of second ultrasonic burst part signals, the pair of first ultrasonic burst part signals have a first frequency, the pair of second ultrasonic burst part signals have a second frequency, the first frequency and the second frequency are different from each other, a first time interval is defined between the pair of first ultrasonic burst part signals, a second time interval is defined between the pair of second ultrasonic burst part signals, a third time interval is defined between one of the pair of first ultrasonic burst part signals and one of the pair of second ultrasonic burst part signals, and the first, second and third time intervals are all the same each other.

12. A method of calculating a flow velocity of a fluid comprising:

generating a series of burst signals;
converting the series of burst signals to a series of ultrasonic burst signals;
irradiating the series of ultrasonic burst signals to the fluid containing at least one of bubbles and particles;
converting a series of reflected ultrasonic burst signals that has been reflected by at least one of the bubbles and particles in the fluid to a series of electrical received signals;
converting the series of electrical received signals to a series of digital received signals;
performing correlation processing on the series of digital received signals to calculate a flow velocity profile; and
calculating a volumetric flow based on the flow velocity profile,
wherein the series of ultrasonic burst signals includes a first, second and third ultrasonic burst part signals, the first ultrasonic burst part signal has a first frequency, the second ultrasonic burst part signal has a second frequency, the third ultrasonic burst part signal has a third frequency, a first time interval is defined between the first and second ultrasonic burst part signals, a second time interval is defined between the second and third ultrasonic burst part signals, and the first time interval and the second time interval are all different from each other.

13. The method of calculating the flow velocity of the fluid according to claim 12, wherein the first time interval is not a multiple of the second time interval, and the second time interval is not a multiple of the first time interval.

14. A method of calculating a flow velocity of a fluid comprising:
generating a series of burst signals;
converting the series of burst signals to a series of ultrasonic burst signals;
irradiating the series of ultrasonic burst signals to the fluid containing at least one of bubbles and particles;
converting a series of reflected ultrasonic burst signals that has been reflected by at least one of the bubbles and particles in the fluid to a series of electrical received signals;
converting the series of electrical received signals to a series of digital received signals;
performing correlation processing on the series of digital received signals to calculate a flow velocity profile; and
calculating a volumetric flow based on the flow velocity profile,
wherein the series of reflected ultrasonic burst signals includes a first, second and third reflected part signals, the first reflected part signal is generated by the first ultrasonic burst part signal reflected in the fluid, the second reflected part signal is generated by the second ultrasonic burst part signal reflected in the fluid, and the third reflected part signal is generated by the third ultrasonic burst part signal reflected in the fluid.

15. The method of calculating the flow velocity of the fluid according to claim 14, wherein the correlation processing calculates a first correlation coefficient and a second correlation coefficient, the correlation processing is performed based on a first, second and third digital part signals, the first digital received part signal converted from the first reflected part signal, the second digital received part signal converted from the second reflected part signal, the third digital received part signal converted from the third reflected part signal, and the flow velocity profile is calculated based on the first and second correlation coefficients.

16. The method of calculating the flow velocity of the fluid according to claim 15, wherein an additional correlation coefficient is calculated by multiplying the first and second correlation coefficients, and a flow velocity of the fluid is decided based on a peak value of the additional correlation coefficient.

17. A method of calculating a flow velocity of a fluid comprising:
generating a series of burst signals;
converting the series of burst signals to a series of ultrasonic burst signals;
irradiating the series of ultrasonic burst signals to the fluid containing at least one of bubbles and particles;
converting a series of reflected ultrasonic burst signals that has been reflected by at least one of the bubbles and particles in the fluid to a series of electrical received signals;
converting the series of electrical received signals to a series of digital received signals;
performing correlation processing on the series of digital received signals to calculate a flow velocity profile; and
calculating a volumetric flow based on the flow velocity profile,
wherein the series of ultrasonic burst signals includes a pair of first ultrasonic burst part signals and a pair of second ultrasonic burst part signals, the pair of first ultrasonic burst part signals have a first frequency, the pair of second ultrasonic burst part signals have a second frequency, the first frequency and the second frequency are different from each other, a first time interval is defined between the pair of first ultrasonic burst part signals, a second time interval is defined between the pair of second ultrasonic burst part signals, a third time interval is defined between one of the pair of first ultrasonic burst part signals and one of the pair of second ultrasonic burst part signals, and the first, second and third time intervals are the same each other.

* * * * *